Oct. 25, 1955 D. M. HARVEY 2,721,545
TOP CYLINDER VAPOR LUBRICATOR
Filed June 9, 1949 2 Sheets-Sheet 2
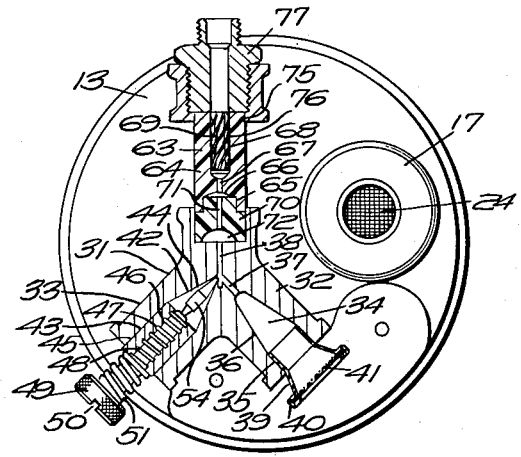
Fig. 5
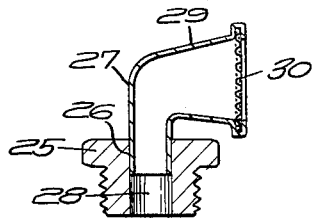
Fig. 6
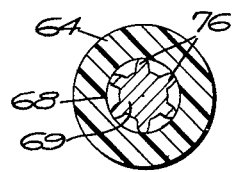
Fig. 8
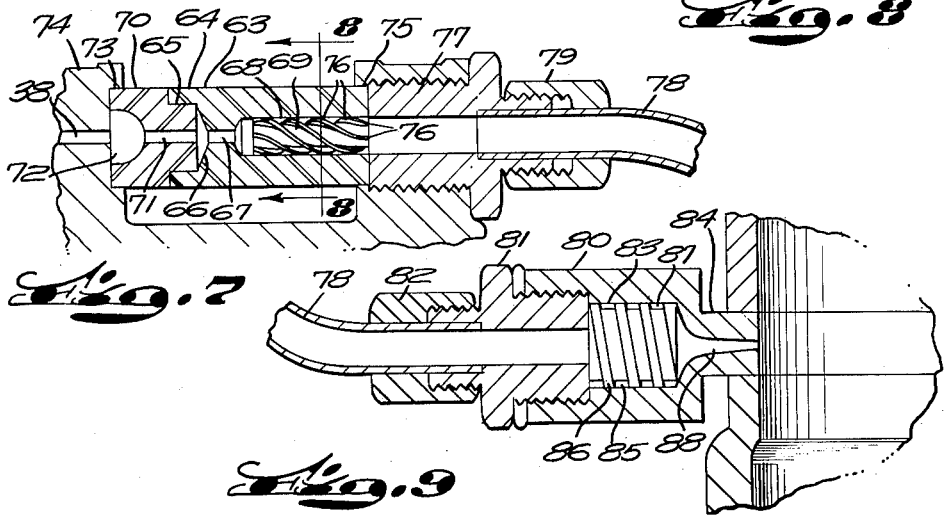
Fig. 7
Fig. 9
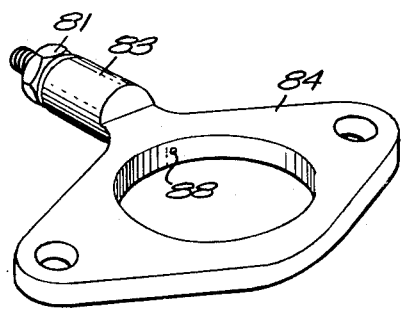
Fig. 10
INVENTOR.
Draper M. Harvey
BY Nathaniel Frucht
Attorney

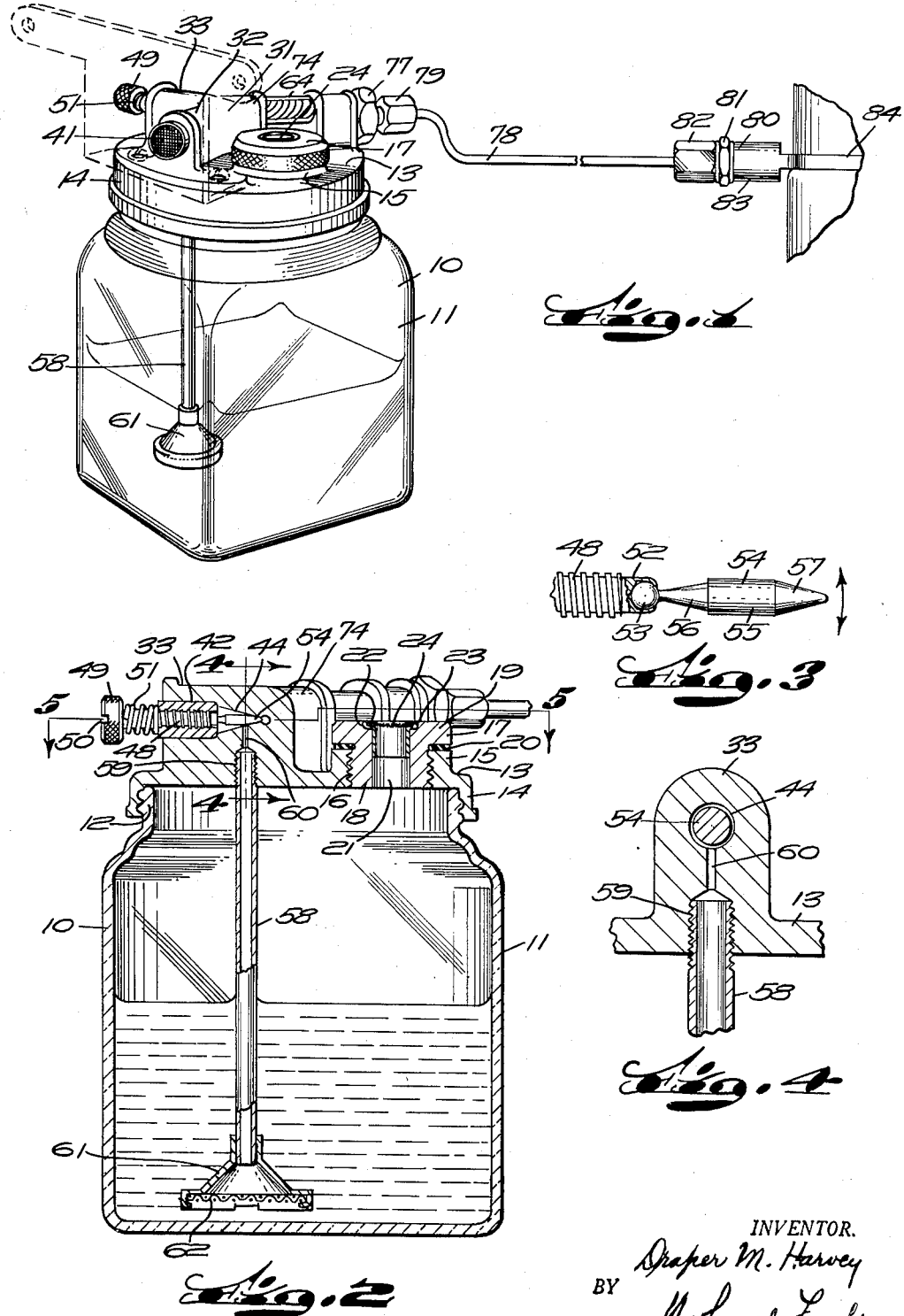

United States Patent Office 2,721,545
Patented Oct. 25, 1955

2,721,545

TOP CYLINDER VAPOR LUBRICATOR

Draper M. Harvey, Hingham, Mass., assignor to Automotive & Marine Products Corp., a corporation of Massachusetts Application June 9, 1949, Serial No. 98,009

7 Claims. (Cl. 123—196)

The present invention relates to the automotive engine art, and has particular reference to the controlled delivery of treatment fluids to the combustion chamber and the upper cylinder parts of an internal combustion engine.

The principal object of the invention is to provide a novel arrangement for delivering a controlled volume of liquid to the combustion chamber and the upper cylinder parts in the form of a finely dispersed vapor.

Another object of the invention is to provide a mechanism for creating an atomized vapor and distributing the created vapor to an automatic feed line under differential pressure.

A further object of the invention is to provide a system for introducing finely dispersed lubricating liquids into the upper cylinder section of an internal combustion engine.

An additional object of the invention is to provide an auxiliary apparatus for an internal combustion engine, to supply treatment fluid and particularly lubricating fluid to the primary fuel-air charge in the form of a finely dispersed vapor whereby cylinder compression is improved, compression pressures are equalized, and blow by of engine fuel and primary engine lubricating oils is reduced or eliminated.

Another object is to supply upper cylinder lubrication to the upper combustion chamber, the cylinder components and the related running parts within and surrounding the combustion chamber, before ignition is developed within the engine.

A further object is to supply treatment fluid to the fuel-air charge in the form of a completely dispersed vapor, for cooling the fuel-air charge, reducing its detonation characteristics, and increasing thermal efficiency by reducing engine operating temperatures.

Another object of the invention is to supply an internal combustion engine with a finely dispersed treatment vapor for preventing the formation of combustion deposits on the engine parts, and controlling and reducing formed combustion deposits, whereby the volumetric efficiency of the engine is increased and the proper distribution of the fuel-air mixture to the engine is facilitated.

An additional object is to introduce and uniformly distribute a lubricant to the operating parts of an engine to thoroughly lubricate and clear the cylinder walls, pistons, piston rings, intake valves, exhaust valves and valve guides, whereby failure and wear of the mechanical parts are reduced.

A further object of the invention is to provide an arrangement for introducing a finely dispersed vapor of lubricating oil and other suitable treatment fluids to the upper mechanical operating parts of an engine, to provide active and adequate lubrication before the primary lubricants, with or without additives, can be agitated or directed under pressure to these parts from the crankcase or through the pressure system of the engine.

An additional object of the invention is to improve engine efficiency and operation by supplying the upper heat section of an engine with a lubricant particularly designed to meet the heat conditions therein.

A further object is to provide an effective top cylinder lubrication for the intake and exhaust valves and the upper cylinder walls and upper piston rings, whereby loss of power and efficiency resulting from gum, carbon and other combustion deposits, and engine varnish are eliminated.

With the above and other objects and advantageous features in view, the invention consists of a novel method of operation and a novel arrangement of parts more fully disclosed in the detailed description following, in conjunction with the accompanying drawings, and more specifically defined in the claims appended thereto.

In the drawings,

Fig. 1 is a perspective view of the novel top lubrication parts;

Fig. 2 is a central vertical section through the oil container and the closure top;

Fig. 3 is an enlarged detail view of the oil feed needle valve assembly;

Fig. 4 is an enlarged detail section on the line 4—4 of Fig. 2;

Fig. 5 is a section on the line 5—5 of Fig. 2;

Fig. 6 is an enlarged sectional detail of a modified air intake;

Fig. 7 is an enlarged sectional detail of the outlet connection from the closure top;

Fig. 8 is an enlarged detail section on the line 8—8 of Fig. 7;

Fig. 9 is an enlarged detail section of the delivery connection to the intake manifold, and Fig. 10 is a perspective view of an illustrative bracket plate ring.

It has been found that the upper cylinder sections of internal combustion engines are subjected to operating conditions which affect thermal and volumetric efficiency, and which create special lubricating difficulties for the moving parts, resulting in wear, loss of compression, baking and varnishing of combustion residues and formation of gum, as the upper cylinder parts require active and adequate lubrication before the primary engine lubricants can be agitated or directed under pressure to these parts from the crank case or through the oil pressure system of the engine.

Further, it has been found that engine operation can be improved by supplying treatment fluids in proper form to the upper cylinder parts, and if desired, by aiding primary ignition by adding a combustible vapor to the primary air-fuel mixture.

To this end, I have determined that it is feasible to supply treatment fluid, such as combustible vapors, special additives to increase fuel octane rating, and upper cylinder lubricant, to the combustion chamber and its operating parts in the form of a finely dispersed spray or vapor, the finely dispersed spray or vapor being preferably thoroughly and uniformly mixed into and with the fuel-air stream.

I have therefore devised a simple and effective arrangement for mixing the treatment fluid with carrier air, vaporizing the fluid and dispersing and entraining the vapor into the carrier air, and conveying the carrier air and the entrained vapor to thoroughly mix with and into the intake fuel-air stream regardless of the pressure differential between the carrier air supply and the intake stream, and regardless of the rate of intake, which may be sustained, accelerated or decelerated. When the treatment fluid contains solids, it is essential that the dispersion persist with a minimum of precipitation or separation of the solid elements, whereby it is desirable to provide means for revaporizing and redispersing the fluid before mixing into and with the fuel-air stream.

Although any of the standard types of treatment fluids and additives may be vaporized, dispersed and supplied to the upper combustion section, the principal requirement for effective operating efficiency is top cylinder lubrication. Although the description following is specific to the supplying to top cylinder lubricant, it is to be understood that any suitable treatment fluid may be used instead of or with the lubricating oil as hereinafter described, for feeding to the upper cylinder sections in finely dispersed vapor form.

I have devised an arrangement which supplies fluid to the upper heat sections of the engines in the form of a finely dispersed vapor, whereby all the upper operating parts are continually treated with fluid of the desired characteristics without introduction of rust, scale, and other impurities such as are conveyed into the cylinders when fluid such as top cylinder oil is added to the gas tank.

I have found that it is not sufficient for complete lubrication to draw a mixture of air and oil into the intake manifold, and that it is essential to introduce the oil in the form of a finely comminuted vapor or fog which is disseminated throughout the valve chambers and the upper heat section of the engine. I have therefore provided an initial entraining of top cylinder oil in carrier air, and have then dispersed and vaporized the entrained oil and maintained the vaporized oil in finely dispersed condition, and have uniformly entrained the vaporized oil and its carrier air into the intake mixture for the engine.

I have found that the introduction of a fine oil vapor in this manner results in a cool, quiet, smooth-running motor with faster pick-up, increased power, and greater operating efficiency, and with longer operation life, as gumming, accumulation of combustion residues, and valve warping and seat-failure are eliminated.

*The mixing mechanism*

Referring to the drawings, which illustrate a preferred embodiment for supplying lubricating oil, the top lubricator 10 includes an oil container 11, preferably made of glass or other transparent material, having a reduced threaded neck 12. A closure top 13 is provided with a depending threaded flange 14 for sealing mounting on the container neck, and is preferably made of metal, although plastic may be used if desired.

Venting air is admitted to the container through an upstanding boss 15 on the closure top, the boss having a central threaded opening 16 for receiving a correspondingly threaded air inlet cap 17, which is preferably of metal and which includes a lower threaded portion 18 for securing in the opening 16 and an enlarged head portion 19 which is adapted to seat on the boss 15, a packing washer 20 being preferably interposed. The cap 17 has a central air passageway 21, and an enlarged upper recess 22 is provided to receive a metal shell 23 which is equipped with a foraminated air filter or screen 24.

If desired, the air inlet cap may be made in the form of a cap 25, see Fig. 6, for receiving the lower cylindrical portion 26 of an upstanding funnel shaped metal shell 27, the portion 26 being locked in the central bore 28 of the cap and the outer conical portion 29 of the shell extending laterally and having an air filter or screen 30. This form of air inlet cap is desirable in installations where dust or dirt laden air is prevalent, as the shell may be mounted to extend the inlet to the side or rear; or the shell may be turned to position the inlet forwardly when increased pressure of carrier air is desired.

The air inlet cap permits a free and unrestricted entry of filtered atmospheric air to the interior of the container as the oil level therein lowers during engine operation, whereby a constant atmospheric pressure is maintained on the oil in the container.

The closure top is designed to permit flow of oil from the container and of entraining air, by suction from the engine intake manifold. The closure top is provided with an upstanding housing 31 for this purpose, the housing being of Y shape, one leg 32 of the housing being utilized to convey carrier air to a mixing passage, and the other leg 33 including mechanism for withdrawal of oil from the container and for regulated delivery of the withdrawn oil to the mixing passage.

The leg 32 has an air inlet bore 34 which comprises a cylindrical outer portion 35, a tapered central portion 36, and a narrow air flow channel 37 which communicates with a central longitudinal mixture channel 38, the axis of the air inlet bore being at an angle of approximately forty-five degrees to the channel 38. The cylindrical outer portion 35 houses a funnel shaped shell 39 which has an enlarged outer portion 40 equipped with an air filter or screen 41.

The leg 33 has an oil passage 42 with a cylindrical outer portion 43 and a conical inner portion 44 which communicates with the mixture channel 38, the axis of the passage 42 being at an angle of approximately forty-five degrees to the channel 38. A plug 45 is seated in the portion 44 and has a square threaded central bore 46 for receiving a similarly threaded enlarged portion 47 of a valve stem 48, the valve stem 48 being provided with a manually adjustable knurled head 49 which has a screw slot 50; a spring 51 is seated on the valve stem between the head 49 and the outer end of the leg 33 to provide a resilient tension on the valve stem for maintaining its initial setting.

As more clearly shown in Fig. 3, the inner end 52 of the valve stem has a conical recess the sides of which are spun over a terminal ball 53 of an elongated needle valve 54 to provide a universal connection; the valve 54 is formed with a central cylindrical portion 55, a rear tapered end 56 which terminates in the ball end 53, and a forward tapered end 57 which is shaped to correspond to the conical inner portion 44 of the bore 42 for obtaining a regulated oil flow into the channel 38.

The needle valve is self-aligning and self-seating due to the universal connection and is free to turn, whereby it breaks up any formation of an oil seal with high viscosity oils and prevents accumulation of graphite and other solids from the oil, as well as deposits of gas loaders and additive materials. The conical recess seat for the valve ball end permits a slight play in response to vacuum and pressure changes, to keep the valve seat clear.

Oil from the container 11 is drawn into the closure top through a vertical tube 58 which is threaded into a vertical threaded recess 59 in the leg 33, a reduced vertical passage 60 leading from the recess 59 to the conical inner portion 44 of the bore 42. The tube 58 depends into the container and is provided with a conical inlet fitting 61 which has an oil screen or filter disk 62 at its lower end, the tube being of a length to bring the oil screen disk 62 in spaced adjacency to the bottom wall of the container 11.

It is thus clear that suction induced by the engine intake creates a low pressure in the mixture channel of the closure top to draw in screened air and a regulated flow of oil from the container, to mix in the mixture channel. However, it has been determined that drawing a mixture of entrained oil drops and carrier air into the intake manifold does not create an effective top cylinder lubrication, and instead may create difficulties by leaving residues which clog the intake manifold. Further, the addition of oil drops to the intake manifold reduces starting effectiveness in cold weather by forming condensation foci.

It has therefore been found necessary to vaporize the entrained oil drops and to disperse the vaporized oil evenly throughout the carrier air.

*The vapor forming mechanism*

The air supplied through the air intake passage 34 and the regulated flow of oil through the valve controlled oil channel 42 which enter the mixture channel 38 are therefore led into a vaporizer 63 which vaporizes and disperses the oil in the carrier air.

The vaporizer 63 includes a block 64, preferably of cylindrical form and made of transparent plastic, which has a cylindrical bore 65 at its forward end, the bore tapering sharply to provide a shallow conical chamber 66 with an axial flow passage 67 which leads to an enlarged bore 68 forming a chamber in which a whirl device 69 is secured. An auxiliary block 70, also preferably cylindrical, has a rear reduced plug end which seats in the bore 65, and an axial passage 71 which leads from a cup shaped chamber 72, the two blocks being assembled to seat in an annular recess 73 in the base 74 of the Y-shaped housing and in a suitable bearing 75 on the closure top, with the passages 38, 71 and 67 in aligned relation. The whirl device 69 is preferably of metal, in the form of a cylinder with spiral surface vanes 76.

The carrier air with its entrained drops of oil flows from the enlarged cup-shaped chamber 72 and through the axial passage 71 into the laterally extending shallow conical chamber 66 and through the axial flow passage 67 into the enlarged bore 68 in which the whirl device 69 is secured.

When the carrier air and its entrained oil enter the whirl device 69 the mixture has a high speed centrifugal whirl imparted to it which breaks the oil into a fine vapor, mist or fog. If the flow connection to the intake manifold is short, the air-vapor mixture may be drawn directly into the manifold; if the flow connection is of long length, it may be advisable in some cases to apply heat to the connection to maintain the vapor condition, but it is preferred to so construct the delivery mechanism that the oil is again subjected to a centrifugal whirl, in order to revaporize any oil drops or condensation.

*The delivery connection*

The air-vapor mixture from the whirl device flows through a fitting 77 mounted in the bearing 75 and through a conduit 78 such as flexible tubing which is locked to the fitting 77 by a threaded lock nut 79, to a delivery connection 80, see Fig. 9.

The delivery connection 80 includes a union or fitting 81 to which the other end of the conduit 78 is connected, as by a threaded bushing 82. The air-vapor mixture passes into a housing 83 forming part of a bracket plate ring 84, the ring 84 being locked between intake manifold sections, and the housing 83 having a central bore 85 in which a cylindrical whirl device 86 is secured, the whirl device being a plug provided with a helical groove 87 so that the incoming air-vapor mixture again has a high speed centrifugal whirl imparted to it to revaporize and redisperse the oil in the carrier air. The air-vapor mixture exiting from the whirl device 86 is drawn into the intake manifold through a stream-line high speed nozzle recess 88, see Fig. 8, to spread transversely across the intake manifold for entraining uniformly with the intake gas and air stream. If desired, several nozzle recesses may be utilized to provide a more even dispersion and a more thorough mixing with the intake gas and air.

It is thus clear that the improved treatment fluid supply system includes an initial mixing of carrier air and regulated entrained fluid, a more thorough mixing in a surge chamber, a regulated flow of fluid mixture to a vaporizer in which the fluid is vaporized and dispersed uniformly throughout the carrier air stream, and a conducting of the air-vapor mixture to an intake manifold, preferably through a delivery connection which revaporizes and redisperses the fluid in the carrier air and then projects the air-vapor mixture into the intake manifold across the stream of intake gas and air.

The term "vapor" is used in a broad sense, to denote a fine dispersion of fluid in the form of a vapor, spray or mist, and the term "fluid" broadly includes lubricating and treatment liquids such as carrier oils, with or without additives such as ethyl fluid, gum inhibitors, fixed oils, animal fats and other treatment fluids and treatment solids, including emulsions, water and water solutions such as water-alcohol solutions, and the like. The term "lubricator" broadly describes an auxiliary apparatus, which however may be permanently installed, for supplying treatment fluid in the form of a vapor to an automotive engine.

The top lubricator which is specifically described herein is particularly designed for engines which operate with an intake manifold that is sub-atmospheric or is pressurized by partial supercharging of the intake air, but the invention may be readily adapted to other types of engines in which a controlled pressure differential is maintained between the lubricator and the intake manifold.

Although I have described a specific constructional embodiment of my invention, it is obvious that changes in the size, shape and arrangement of the parts and in their relative operation may be made to meet requirements for different automotive engine installations, without departing from the spirit and the scope of the invention as defined in the appended claims.

I claim:

1. A lubricator for an automotive engine, having a container for lubricating fluid, a closure top on said container, an air inlet in said closure top communicating with the container, a Y-shaped housing on said closure top, a mixture channel in the stem of the Y-shaped housing, an air intake passage in one leg of the housing communicating with the mixture channel, a fluid inflow passage in the other leg of the housing having a connection for receiving fluid from the container and communicating with the mixture channel, said fluid inflow passage having a regulatable flow control valve, means on said closure top providing a vaporizer chamber receiving fluid-air mixture from the mixture channel, a whirl device in the vaporizer chamber having peripheral vanes for whirling the received fluid-air mixture, and an outflow conduit for receiving vaporized fluid-air mixture from the vaporizer.

2. In combination with the structure of claim 1, a mixture delivery fitting for the outflow conduit having a chamber, a whirl device therein with peripheral helical groove means, and a converging outflow nozzle.

3. In combination with the structure of claim 1, a bracket plate injection device having an inflow housing for receiving a fluid-air mixture, a central bore in said housing, and means for revaporizing and redispersing the mixture comprising a cylindrical whirl device plug in said bore having peripheral helical groove flow means, and an outflow nozzle recess having converging walls.

4. A lubricator for an automotive engine having a container for lubricating fluid, a closure top on said container, an air inlet in said closure top communicating with the container, a mixture channel in said closure top, an air intake passage communicating with the mixture channel, a fluid inflow passage having a connection for receiving fluid from the container and communicating with the mixture channel, said fluid inflow passage having a regulatable flow control valve, means on said closure top providing a vaporizer chamber, a passage communicating the mixture channel with the vaporizer chamber, a surge chamber in said passage, a whirl device in said vaporizer chamber, and an outflow conduit for receiving vaporized fluid-air mixture from the vaporizer chamber.

5. In the structure of claim 4, said passage communicating the mixture channel with the vaporizer chamber also having a shallow conical enlargement.

6. In combination with the structure of claim 4, a mixture delivery fitting for the outflow conduit having a chamber, a whirl device in said chamber with peripheral helical groove means, and a converging outflow nozzle.

7. In combination with the structure of claim 4, a bracket plate injection device having an inflow housing for receiving a fluid-air mixture, a central bore in said housing, and means for revaporizing and redispersing the mixture comprising a cylindrical whirl device plug in said bore having peripheral helical groove flow means, and an outflow nozzle recess having converging walls.

References Cited in the file of this patent

UNITED STATES PATENTS

| | | |
|---|---|---|
| 860,259 | Smith | July 16, 1907 |
| 1,066,161 | Stilz | July 1, 1913 |
| 1,315,018 | Harris | Sept. 2, 1919 |
| 1,356,732 | Murphy | Oct. 26, 1920 |
| 1,512,954 | Smith | Oct. 28, 1924 |
| 1,839,279 | Van Tuyl | Jan. 5, 1932 |
| 1,917,125 | Jackson | July 4, 1933 |
| 1,982,884 | Schroder | Dec. 4, 1934 |
| 2,053,287 | Hiller | Sept. 8, 1936 |
| 2,079,676 | Carson | May 11, 1937 |
| 2,112,538 | Loughlin | Mar. 29, 1938 |
| 2,119,927 | Reid | June 7, 1938 |
| 2,159,711 | Rudnick | May 23, 1939 |
| 2,187,998 | Carpenter | Jan. 23, 1940 |
| 2,428,915 | Keller | Oct. 14, 1947 |
| 2,457,389 | Maclay | Dec. 28, 1948 |
| 2,541,129 | Taber | Feb. 13, 1951 |

FOREIGN PATENTS

| | | |
|---|---|---|
| 503,020 | Great Britain | Mar. 27, 1939 |
| 834,670 | France | Aug. 29, 1938 |
| 867,380 | France | July 21, 1941 |